United States Patent [19]
Roland

[11] 3,790,330
[45] Feb. 5, 1974

[54] COMPACT PRESS AND PELLET PLUNGER

[75] Inventor: Charles H. Roland, Toledo, Ohio

[73] Assignee: Phillips Petroleum Company, Washington, D.C.

0[22] Filed: May 4, 1972

[21] Appl. No.: 250,294

[52] U.S. Cl............... 425/412, 425/355, 425/438, 425/444, 425/317
[51] Int. Cl. .............................................. B29c 3/00
[58] Field of Search... 425/406, 412, 355, 317, 438, 425/444, 801, 804, 808

[56] References Cited
UNITED STATES PATENTS

| | | | |
|---|---|---|---|
| 1,028,108 | 6/1912 | Haefely | 425/406 |
| 780,856 | 1/1905 | Breitschwerth | 425/438 X |
| 3,274,303 | 9/1966 | Muller | 425/412 X |
| 1,591,572 | 7/1926 | Stimson | 425/808 |
| 3,669,582 | 6/1972 | Smith | 425/355 |

*Primary Examiner*—Robert L. Spicer, Jr.
*Attorney, Agent, or Firm*—Quigg & Oberlin

[57] ABSTRACT

A modified compaction press having a cylinder and piston mounted below a pressure providing means, wherein relatively small amounts of a particulate sample can be subjected to a pressure in the range of 15,000 to 30,000 p.s.i.; the modification comprising a plunger movably positioned in the center portion of a bottom seal means of the press cylinder. The plunger provides a means for in situ breaking of compressed pellet or pill before subsequent repressing in the same cylinder cavity.

3 Claims, 1 Drawing Figure

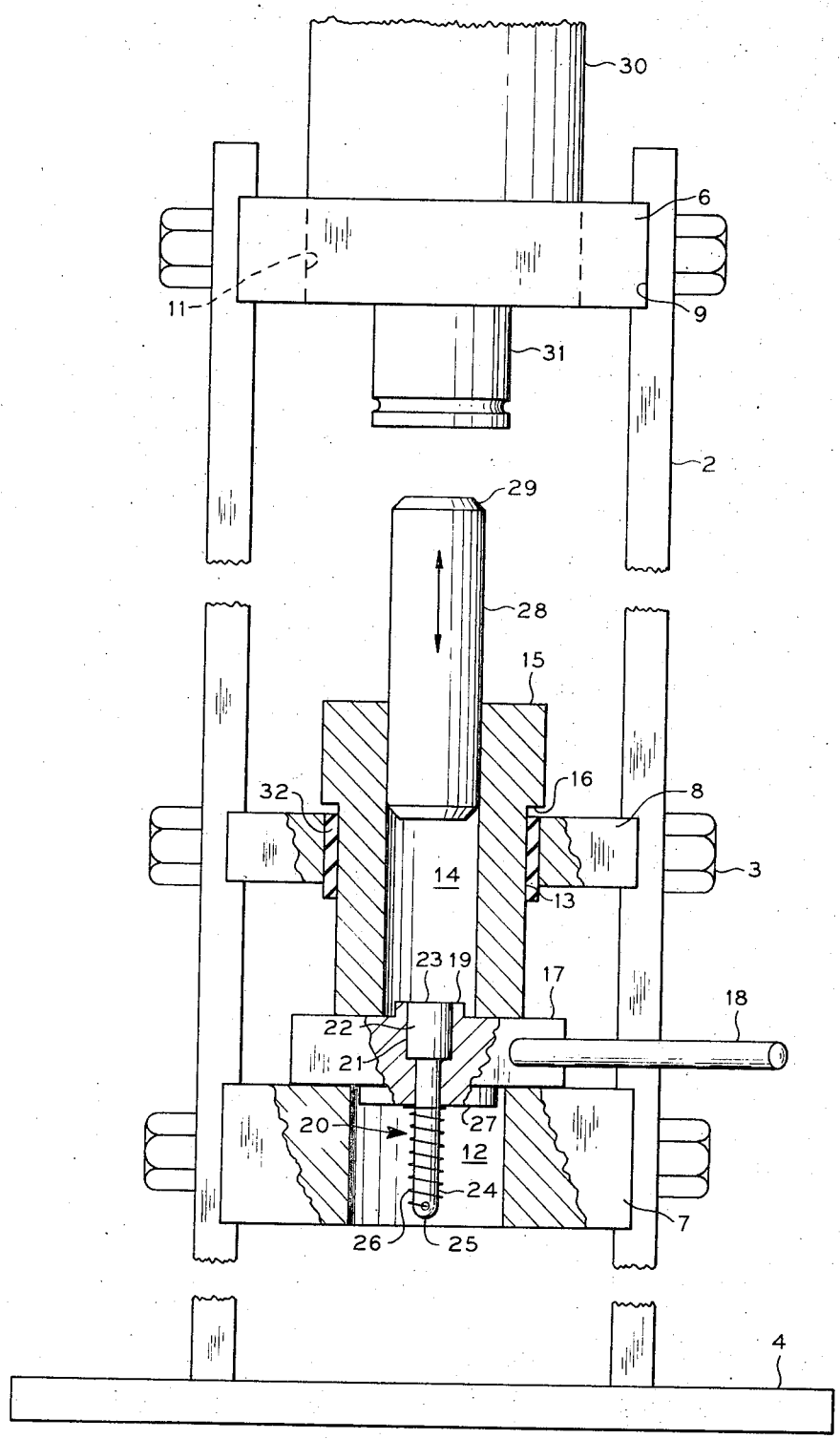

COMPACT PRESS AND PELLET PLUNGER

This invention relates to a compaction press which is suitable for subjecting relatively small amounts of granular or powder form material to high pressures. In another aspect, this invention relates to a modified compaction press having a plunger movably positioned in the center portion of a bottom seal means of the press cylinder thereby providing a means for in situ breaking of pressed pellets. In another aspect, this invention relates to apparatus for the repeated subjection of carbon black particles to a pressure in the range of from 15,000 to 30,000 p.s.i. In a further aspect, this invetion relates to apparatus which is designed to repeatedly compress carbon black particulate samples and break the resulting pellets prior to subjecting the carbon black to the ASTM D2414-67T dibutyl phthalate absorption test.

For many years, those in the carbon black industry and those in the rubber industry have utilized the ASTM D2414-67T DBP absorption test to determine the structure of carbon black. Structure refers to the force responsible for agglomeration, that is particle-to-particle forces. Because of the particulate nature of carbon, it is necessary to measure the effects of these agglomerative forces by indirect methods. The ASTM procedure mentioned above has been widely accepted as a standard test by the carbon black and rubber industries in determining structure, this specification having become critical for both producers of carbon black and those who use carbon black, especially in the fabrication of natural and synthetic rubber automobile tires. The basic importance of the structural property of carbon black in rubber compounding results from the fact that it is this property which determines the reduction in nerve of an elastomer when the two are mixed together. The reduction in nerve reduces shrinkage when an elastomer is extruded through a die; hence, one measure of the effect of the structure upon the elastomer is extrusion shrinkage or die swell.

It was reported by the American Chemical Society, Division of Rubber Chemistry Meeting, Sept. 13–16, 1966, at New York, N.Y., in a paper by R. E. Dollinger, R. H. Kallenberger and M. L. Studebaker, entitled "The Effect of Carbon Black Densification on Structure Measurements and Rubber Properties" that the test results obtained by conventional methods to determine carbon black structure were very dependent upon the previous history of the sample, that is, by the amount of mechanical work performed on the sample prior to the test. The authors reported that a direct relationship could be shown between carbon black structure and extrusion shrinkage of the elastomer if the carbon black was subjected to repeated high pressure compression prior to running the standard ASTM D2414-67T DBP absorption procedure. Accordingly, it became desirable for the industry to develop a press which would enable small samples of carbon black to be compressed in the range of 15,000 to 30,000 p.s.i. in order that the sample might be prepared for running the above ASTM DBP absorption test. The utilization of compression prior to determining the structure of the black enables the rubber fabricator to predict the effect of structure on the resulting extrusion shrinkage of the rubber-carbon black mixture.

Due to the fact that the compression of a carbon black sample prior to running the DBP absorption test is to be under laboratory conditions, it was deemed highly desirable to have a press which could be manipulated easily by a laboratory technician wherein repeated pressings could be made of various samples over a period of time. The laboratory methods known at this time utilize apparatus to compress the carbon black sample into a pellet or pill form which must be then removed from the compression cylinder to be broken and recompressed. The compression, breaking and recompression steps are repeated several times, depending upon the desired end result. The repeated steps of compressing and removing the sample from the compressed cylinder, however, expose the sample to risk of loss, dust, dirt, and operator error. Accordingly, it is desired to develop a compact press having the feature of a pellet plunger which eliminates the foregoing problems and enables the operation of several repeated compressions with intervening breaking of the compressed pellet in situ without removal from the cylinder cavity.

I have discovered a compact carbon black press and pellet plunger apparatus which overcomes deficiencies and those of the prior art. Briefly, the apparatus of the invention comprises a cylinder and piston mounted in a suitable framing device which enables a pressure providing means to force the piston through the internal diameter of the cylinder, thereby compressing a carbon black sample which has been placed in the cylinder. The apparatus further provides a pellet plunger means for breaking in situ the pelletized carbon black. The pellet plunger of the invention resides in the bottom seal plate upon which the carbon black sample is compressed. The plate is provided with a handle which allows the operator to easily remove the carbon black sample after repeated compression and breaking steps. The bottom seal plate is also provided with alignment means on the upper and lower surfaces thereof which insures that the plate is in proper position in order to proceed with the pressing of the black. The plate has an opening through the center portion to accomodate a break-up mandrel or plunger which has a stem protruding from the bottom of the seal plate and is held in at-rest position by a spring or related means. This modified bottom seal plate-plunger apparatus allows the operator to break up the pressed pellet of black after each compression; for example, by rapping the stem with a mallet after the compression piston is withdrawn. The compressed pellet which was lying on the polished surface of the bottom seal plate is broken up by impact as the plunger rises into the cylinder chamber as a result of impact upon its stem. The spring or related means retracts the plunger to an at-rest position, and repeated compression may proceed without removing the carbon black sample from the cylinder. The apparatus of the invention eliminates sample loss, dust, and dirt from the pressing operation and enables as many compression steps as necessary to be made in situ without removing the pellet for breaking purposes.

Accordingly, it is an object of this invention of provide a press and pellet plunger which enables repeated compression and breaking of particulate or powdered samples. It is a further object of this invention to provide a press and plunger means which is designed to compress and in situ break carbon black pellets prior to subjecting the carbon black to the ASTM D2414-67T dibutyl phthalate absorption test.

Other objects and advantages of the present invention will be more apparent from the reading of the following disclosure, claims and the drawing, wherein the sole FIGURE is a cut-away elevation of the apparatus of the invention.

The press and pellet plunger of the invention and the operation thereof can best be understood by a detailed description of the drawing. Referring to the drawing, the press of the invention consists of a pair of upstanding sides 2 which are mounted on base 4. Sides 2 are provided with grooves 9 which enable three cross plates or guide plates to fasten by bolts 3 to the sides 2. The three cross plates are therefore mounted at right angles to sides 2. The upper plate 6 is a pressure providing means mounting block which has opening 11 therein and is adapted to receive the pressure providing means 30. The lower plate 7 is a bottom plate having an opening 12 therein. Plate 8 located intermediate plate 6 and plate 7 is a cylinder support means having an opening 13 therein, opening 13 being designed to receive cylinder 15. Cylinder 15 is easily removable from the opening 13 in plate 8, and has a circumference of the outer surface at its upper portion greater than the circumference at its lower portion, therefore forming flange 16. The interior bore 14 of cylinder 15 is continuous throughout the length of cylinder 15.

The lower portion of the cylinder 15 rests upon bottom seal plate 17. Bottom seal plate 17 is conveniently provided with a handle 18 which protrudes from the lateral edge of seal plate 17. The seal plate is provided with a raised portion 19 which has the same geometrical configuration as the interior bore 14 of cylinder 15. The lower portion of bottom seal plate 17 is provided with a raised portion 27 which has the same geometrical configuration as opening 12 in bottom plate 7. The bottom seal plate 17 has an opening therethrough which accomodates the plunger 20 having a plunger head 22, and a plunger stem 24. The plunger head has an upper surface 23 which when the plunger is in a predetermined at-rest position is in registry with the raised portion 19. The plunger 20 has a stem 24 and a spring 26 which returns the plunger to a predetermined at-rest position following a motivation stroke on the plunger stem lower end 25, thereby causing the movably positioned plunger to enter the cylinder bore 14.

Cylinder 15 immediately below flange 16 is provided with a flexible ring 32 which is continuous about the circumference of the outer surface of the lower portion of cylinder 15 so that when the cylinder is in place in cylinder guide plate 8, the flexible ring contacts the surfaces of opening 13 within cylinder guide plate 8. The flexible ring may be made of natural or synthetic rubber or plastics. The flexible ring 32 upon cylinder 15 assures that proper alignment is maintained during the pressing operation and provides a limited amount of freedom of motion with regard to the position of cylinder 15 upon the bottom seal plate 17. Accordingly, cylinder 15 has a minimal amount of freedom of movement in a horizontal direction, thereby preventing the piston from scraping the surface of bore 14.

The interior surface of bore 14 and exterior surface of piston 28 are aligned in such a way that when plunger 31 exerts a downward force, the piston 28 travels the length of the bore 14. The composition of the cylinder and that of the piston are of certain critical compositions which are hereafter explained. The ends of piston 28, at the edges thereof, are beveled as shown by surface 29. This ensures easy insertion of piston 28 into the bore 14 of cylinder 15.

The raised surfaces 19 and 27 on the seal plate 17 provide a means of proper alignment of the bottom of cylinder 15 so that the actuation of compression plunger 31 against piston 28 to force the piston through the length of bore 14 will not gall or freeze the high friction surfaces in the lower portion of bore 14. The raised surfaces also insure that the operator of the press may remove and replace seal plate 17 in the proper alignment with respect to cylinder 15. It is to be noted that the dimensions of surfaces 19 and 27 are less than the dimensions of bore 14 and opening 12. This is in accordance with the requirement that the cylinder 15 have limited freedom of movement in a horizontal direction which is provided by ring 32. Accordingly, the tolerance between the lateral edge of surface 19 and the surface of bore 14 is greater than the tolerance between the lateral edge of 27 and the surface of opening 12. In operation, the press of the invention is designed to subject a carbon black sample placed in bore 14 of cylinder 15 to a pressure in the range of 15,000 to 30,000 p.s.i., preferably 24,000 p.s.i. At the start of the compression operation, compression plunger 31 will be in a retracted position. Piston 28 is then removed from cylinder bore 14, cylinder 15 is removed from opening 13 and the cylinder guide plate 8, and bottom seal plate 17 is removed from the opening 12 in bottom plate 7 by means of handle 18. Bore 14 of cylinder 15 may then be cleaned with a suitable cleaning means, for example, by passing a cloth through the bore. The surface of piston 28 may then likewise be cleaned by wiping off the piston.

To precompress a sample of carbon black prior to running the ASTM D2414-67T DBP absorption test, the bottom seal plate 17 is placed into opening 12 of bottom plate 7 by means of handle 18. The cleaned cylinder is then inserted into opening 13 of cylinder guide plate 8 in such a way that it rests upon bottom seal plate 17 with raised surface 19 of bottom seal plate 17 projecting into the lower portion of bore 14. This assures the proper alignment of the cylinder so that when plunger 31 forces piston 28 through the length of bore 14, galling of the surfaces of piston 28 and interior bore 14 is prevented.

Twenty-five grams of carbon black sample which is dried at 220°F for one hour are then poured into cylinder bore 14. Piston 28 is then inserted into the upper portion of bore 14 and pushed downward as far as possible through the length of bore 14 of cylinder 15 by hand. The plunger means is then activated. The lower surface of compression plunger 31 is brought into contact with piston 28 thereby subjecting the carbon black sample in bore 14 to a compression of, for example, 24,000 p.s.i. which is read upon a standard pressure gauge. The pressure is held approximately 3 seconds and the plunger activation mechanism is released.

The operator then activates the plunger 20 through a compaction means exerted upon the plunger stem lower end 25 thereby forcing the plunger head 22 into the bore 14 of cylinder 15 containing the compressed carbon black sample. The compressed carbon black pellet which was lying on the raised portion 19 of bottom seal plate 17 and upper surface 23 of plunger head 22, is broken up by impact of the plunger head as it rises into the cylinder chamber bore 14. The plunger stem spring 26 retracts plunger 20 to a predetermined at-rest position thereby again providing a cylinder bore for purposes of compression. The in situ plunger breaking of the compressed carbon black sample pellet eliminates removel of said pellet for breaking purposes, thereby reducing the posibility of sample loss or contamination through operator error. The aforementioned compression, breaking, recompression, steps can be repeated as deemed necessary according to the requirements of the compressed sample.

The operator can remove the last compressed pellet which is unbroken or if conditions require, a broken sample, by grasping the upper portion of cylinder 15 with one hand, lifting it and with his other hand removing bottom seal plate 17 by means of handle 18. When plate 17 is removed, cylinder 15 will rest on cylinder guide plate 8 by means of flange 16. The carbon black sample will usually remain in the bore 14 even though the bottom seal plate 17 has been removed. A small pan is placed upon base 4 immediately below opening 12 of bottom plate 7. Any carbon black present on surface 19 may be suitably transferred to the pan located on base 4. The plunger is then once again activated, forcing piston 28 throughout the length of bore 14 which causes the majority of pressed sample to fall into the pan located on base 4. It should be noted that after compression the carbon black sample is of relatively loose agglomerates, and even if a pellitized carbon black sample is pressed, the resulting pressed carbon black does not remain in a pill type form.

The overall dimensions of the press will be generally in the range of that which is easily mounted in a laboratory. Accordingly, the overall height of the press including the compression and plunger means will generally be in the range of from 2-½ to 4 feet in height. The distance between the sides 2 will be in the range of from 4 to 10 inches. It is apparent, however, that these dimensions are not critical to design of the invention. However, a preferred embodiment of the apparatus of the invention, particularly in reference to the nature of the surfaces of bore 14 and piston 28 in order to avoid galling or freezing require a Rockwell hardness of a metallic surface which is determined by ASTM Procedure E18-61. The surface of bore 14 and the surface of piston 28 must be different. Accordingly, the piston may be made of any metal or metal alloy conventional in the art; however, it must have a Rockwell hardness in the range of 50 to 70C, preferably 60C. The interior surface of bore 14 may also be made of any conventional metal or metal alloy different from the material of the piston wherein a Rockwell hardness of 20 to 45C, preferably 28 to 30C, is provided. A second preferred specification which is deemed adequate to insure operation of the press is that the diameter of piston 28 must be in the range of 0.0015 to 0.0035 inch less than the diameter of bore 14 of cylinder 15. Preferably, the diametral clearance between the surface of piston 28 and the surface of bore 14 is in the range of 0.0024 to 0.0025 inch. When these specifications are met, the activation of plunger 31 upon the surface of piston 28 insures that the piston will travel the length of bore 14 without galling the surface of the piston or that of bore 14 of cylinder 15. These specifications also insure that the carbon black sample pressed in bore 14 will not bleed excessively into the clearance between piston 28 and bore 14.

A third preferred embodiment of the invention requires that the plunger head 22 be in register with the raised surface 19 of bottom seal 17 thereby providing a polished-like surface. In order to provide the polished-like surface, the plunger head 22 when at-rest position through the action of plunger stem spring 26, must be slidably positioned in the bottom seal opening 21 in order to accomodate the plunger head 22 and the plunger stem 24.

Other modifications and variations of the invention are possible without departing from the spirit and scope of the invention. In particular, it is possible to utilize the apparatus for pressing particulate type materials other than carbon black. Furthermore, it is within the scope of the invention to modify the shape of the piston 28 and bore 14; however, a cylindrical configuration is preferred.

What is claimed is:

1. A press conprising:
   a hollow cylinder adapted to receive particulate material to be compressed;
   a piston positioned for movement through said cylinder to exert a force on material in said cylinder;
   means to exert a force on said piston to cause movement thereof through said cylinder toward one end of said cylinder to compress the particulate material;
   a plate positioned across said one end of said cylinder, said plate having an opening therethrough in alignment with the opening through said cylinder;
   a plunger having a head and stem and positioned for movement through the opening in said plate, said plunger stem being positioned to extend beyond said plate on the side thereof remote from said cylinder so that an external force exerted on the end of said stem displaces the head of said plunger into said cylinder for breaking said compressed particulate material within said cylinder; and
   means engaging said plunger to exert a bias force thereon which normally positions said plunger so that the head end thereof is flush with and located at the surface of said plate which is adjacent said cylinder in the absence of an external force being exerted on said stem end of said plunger.

2. The press of claim 1 wherein said plunger head is of greater diameter than said plunger stem, and the opening in said plate is provided with a shoulder on which said plunger head normally rests.

3. The press of claim 2 wherein said means to exert a bias force comprises a spring secured to the stem end of said plunger and extending therefrom to engage said plate so as to exert a force which normally retains said plunger head on said shoulder.

* * * * *